June 24, 1969     C. C. SCHÜLER     3,451,845
METHOD FOR PRODUCING THIN FILMS OF RARE EARTH CHALCOGENIDES
Filed May 31, 1966
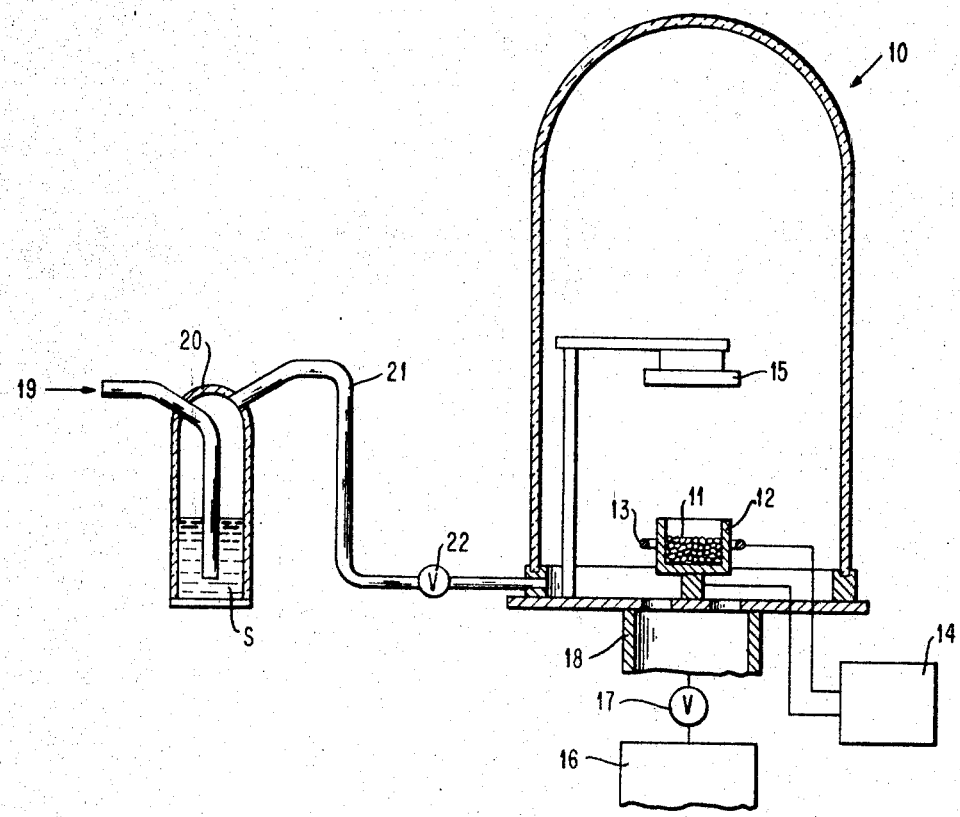
INVENTOR.
CLAUS C. SCHÜLER
BY
ATTORNEY

United States Patent Office 3,451,845
Patented June 24, 1969

3,451,845
METHOD FOR PRODUCING THIN FILMS OF RARE EARTH CHALCOGENIDES
Claus C. Schuler, Oberrieden, Switzerland, assignor to International Business Machines Corporation, Armonk, N.Y., a corporation of New York
Filed May 31, 1966, Ser. No. 554,086
Int. Cl. C23f *17/00;* C23c *13/02;* C07f *11/00*
U.S. Cl. 117—201         12 Claims

ABSTRACT OF THE DISCLOSURE

Thin films of a rare earth chalcogenide (for example, EuS) are produced in situ by vapor-depositing a pure rare-earth metal (for example, Eu) onto an inert substrate in an ultra-high vacuum and then admitting a gaseous chalcogenide-hydrogen (for example, $H_2S$, $H_2Te$ or $H_2Se$) under one to two atmospheres of pressure into the chamber to slowly produce the reaction

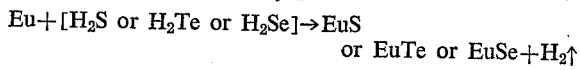

The invention concerns a method for producing thin films of the chalcogenides of the rare earth metals which are characterized by a high degree of chemical purity.

Owing to their optical, electric, and magnetic properties, the chalcogenides of the lanthanides, i.e., the semiconducting saline compounds of rare earths type $4f$ with elements of the VI group of the Periodic Table, are attracting increasing research attention and are beginning to be of interest for potential technical application in the pulse technique or communications are as well as in the technology of data-processing machines. Depending on the chemical composition of solid solutions or alloys of such chalcogenides and on their doping with impurities, their electric conductivity can be modified over a wide range. Their ferromagnetic behavior can be controlled by techniques known from semiconductor physics, owing to its dependence on the concentration of conducting electrons.

A lanthanide such as, e.g., europium is a very strongly reactive metal, so that the production of its pure telluride, selenide, or sulfide presents certain difficulties. The exothermic reaction can take place quite violently. At high temperatures, contamination, particularly by oxygen, can hardly be avoided. Known production methods require temperatures of at least 600–700° C.

It is thus the object of the invention to present a method for producing chemically very pure chalcogenides of the rare earths. With this method these compounds can be produced directly in the form of thin films which are particularly useful for technical applications.

The method for producing thin films of chalcogenides of the rare earths is characterized by the fact that in an ultra-high vacuum lanthanide metal is vapor-deposited onto an inert substrate, and that purified, gaseous chalcogenide-hydrogen is then introduced into the reaction chamber, so that the lanthanide-chalcogenide layer is formed in situ by the reaction, taking place slowly at room temperature, lanthanide+chalcogenide-hydrogen → lanthanide-chalcogenide+hydrogen.

Further features and advantages of the inventive method can be seen from the following description of an embodiment, the production of a film of europium sulfide.

Reference is now made to the sole figure of the drawing to assist in understanding the invention to be described. The first step in the method is the production of a pure metal layer. Europium is vapor-deposited onto an inert substrate 15 in a vacuum chamber 10. Chamber 10 is preferably of glass, since it must be inert to hydrogen sulfide gas even at room temperature. A vacuum pump 16 is connected to the exhaust tube 18 of the apparatus via a valve 17. At the outset, the metal 11, which is to be vaporized, is in a crucible 12 of high-melting material such as tantalum. The heating energy is applied electrically by electron bombardment, such electrons emanating from a cathode ring 13 that surrounds crucible 12. Both electrodes are connected to the current source 14. Other ways are possible, e.g., inductive heating; in that case, crucible 12 is surrounded by an induction coil, not shown, whose ends are connected to the source 14 supplying high-frequency energy. The required vacuum is an ultra-high vacuum, i.e., a pressure lower than $10^{-8}$ torr. Above the evaporation source comprising metal layer 11, crucible 12 and cathode ring 13 is substrate 15, onto which the europium layer is deposited; it must be completely inert chemically and in particular must not react with Eu or $H_2S$ at room temperature. Substrates of substances such as glass, quartz, sapphire, or magnesium oxide (MgO) have proved suitable. The europium layer deposited onto the neutral substrate by evaporation can be up to $100\mu$ thick. Evaporation in an ultra-high vacuum in a well baked out apparatus can be compared to a distillation process. Very pure europium metal layers are therefore obtainable even if the raw material is not of very high purity.

In the second step of the method, the sulfide is formed in situ by the reaction of the metal with gaseous hydrogen sulfide. After the europium layer has been deposited, the $H_2S$ gas supplied to line 19 and, purified by means of a washing bottle 20, is introduced into the reaction chamber of apparatus 10 through line 21 via valve 22. The washing bottle may contain a solution of sulphuric acid S to remove any moisture from $H_2S$, or could be any other cleaning bath, depending upon the contamination to be removed from the $H_2S$. The $H_2S$ gas can fill the chamber up to atmospheric pressure or higher. In the conditions described hereinabove, a very pure metal layer of suitable thickness can react with a gaseous chalcogenide-hydrogen at room temperature: the reaction $Eu+H_2S\rightarrow EuS+H_2\uparrow$ begins at the surface of the metal film and slowly continues throughout the entire layer. The result is a thin film of europium sulfide of extraordinary chemical purity. Any contamination by foreign substances, particularly oxygen, is avoided by the slowness of the reaction taking place at room temperature. High temperatures would of course accelerate the reaction; but contamination with impurities from the crucible material or the apparatus walls would then be difficult to avoid. The speed of the reaction at room temperature can be controlled by the choice of pressure during the second step of the method. The pressure of the chamber can vary from one atmospheric pressure to considerably less than atmsopheric pressure. Pure films will result when one practices the invention close to an atmospheric pressure. The tellurides and selenides of the rare earths can also be produced in accordance with the method described for europium sulfide, since $H_2Te$ and $H_2Se$, like $H_2S$, are gaseous.

For use of the compounds as controllable ferromagnetic material, it is particularly advantageous if, during production, the semiconductor properties are also determined by appropriate doping. Through choice of the dopant electrical insulators, such as EuS, can be made into metallic conductors. Typical dopants would be the sulfides of univalent alkali metals or trivalent rare earths, of which gadolinium is one example. If, for example, gadolinium is evaporated along with the europium, conductivity is increased and the magnetic properties are so modified that the Curie temperature assumes higher values. EuSe and GdSe, as well as EuS and GdS, will form alloys of any desired proportion. Eu and Gd, owing to the same ground state of their 4f electrons, are magnetically equivalent. Electric conductivity can be continuously modified over a range that varies from the insulator to the metal state. That is, the resistivity can be made to vary from about $10^{10}$ ohms to 1 ohm.

What is claimed is:

1. A method for producing thin film chalcogenides of the rare earths comprising:
    (a) vapor-depositing, in an ultra-high vacuum chamber having a pressure lower than $10^{-8}$ torr, a pure lanthanide metal film onto an inert substrate,
    (b) introducing, after such vapor-deposition, a gaseous chalcogenide-hydrogen into said chamber while said lanthanide film is maintained at room temperature so as to produce the reaction of lanthanide metal+chalcogenide→lanthanide - chalcogenide+hydrogen↑.

2. The method of claim 1 wherein said inert substrate is glass.

3. The method of claim 1 wherein said inert substrate is quartz.

4. The method of claim 1 wherein said inert substrate is sapphire.

5. The method of claim 1 wherein said inert substrate is magnesium oxide.

6. The method of claim 1 wherein the film thickness of the vapor-deposited lanthanide metal is of the order of 100µ.

7. A method for producing thin film chalcogenides of the rare earths comprising:
    (a) vapor-depositing, in an ultra-high vacuum having a pressure lower than $10^{-8}$ torr, a pure lanthanide metal film onto an inert substrate,
    (b) returning said metal film to approximately one atmosphere pressure and to room temperature after said deposition has been completed, and then
    (c) introducing a gaseous chalcogenide-hydrogen into said chamber so as to produce the reaction of lanthanide metal+chalcogenide→lanthanide - chalcogenide+hydrogen↑.

8. The method of claim 7 wherein said pressure during the introduction of said gaseous chalcogenide is less than atmospheric pressure.

9. The method of claim 7 wherein said gaseous chalcogenide is $H_2Te$.

10. The method of claim 7 wherein said gaseous chalcogenide is $H_2Se$.

11. The method of claim 1 wherein said deposited lanthanide metal film is europium and said reaction product is europium sulfide.

12. A method for producing thin film chalcogenides of the rare earths comprising:
    (a) vapor-depositing onto a substrate, in an ultra-high vacuum having a pressure lower than $10^{-8}$ torr, pure europium metal, doping said europium metal with gadolinium, and
    (b) introducing, after such doping step, a gaseous chalcogenide-hydrogen into said chamber while said gadolinium-doped europium is maintained at room temperature and at atmospheric pressure so as to produce the chalcogenide of the gadolinium-doped layer.

References Cited

UNITED STATES PATENTS

| | | | |
|---|---|---|---|
| 2,932,592 | 4/1960 | Cameron | 117—211 |
| 3,034,924 | 5/1962 | Kraus et al. | 117—106 |
| 3,271,192 | 9/1966 | Thun et al. | 117—106 X |
| 3,376,157 | 4/1968 | Guerci et al. | 117—106 |

ALFRED L. LEAVITT, *Primary Examiner.*

A. GOLIAN, *Assistant Examiner.*

U.S. Cl. X.R.

117—106, 107, 124; 148—6.3